United States Patent [19]

Støren

[11] Patent Number: 4,518,438

[45] Date of Patent: May 21, 1985

[54] METHOD OF TRANSPORT, COOLING AND COMPRESSION OF NITROGEN OXIDE-CONTAINING GASES

[75] Inventor: Harald Støren, Olso, Norway

[73] Assignee: Norsk Hydro a.s., Oslo, Norway

[21] Appl. No.: 519,813

[22] Filed: Aug. 3, 1983

[30] Foreign Application Priority Data

Aug. 6, 1982 [NO] Norway ................................ 822688

[51] Int. Cl.³ ................................................ B08B 9/00
[52] U.S. Cl. .................................... 134/22.1; 134/36; 134/37; 134/42; 415/1
[58] Field of Search .................... 134/22.1, 36, 37, 42; 415/1, 121 A, 168; 137/15

[56] References Cited

U.S. PATENT DOCUMENTS

| | | | |
|---|---|---|---|
| 3,084,076 | 4/1963 | Loucks et al. | 134/36 X |
| 3,297,481 | 1/1967 | Newman | 134/36 X |
| 3,424,371 | 1/1969 | Happe | 415/1 |
| 3,830,660 | 8/1974 | Ezell | 415/1 |
| 4,295,895 | 10/1981 | Kongshaug | 134/37 X |

Primary Examiner—Marc L. Caroff
Attorney, Agent, or Firm—Wenderoth, Lind & Ponack

[57] ABSTRACT

The present invention relates to a method for the transference, cooling and compression of nitrogen oxide-containing gases. In critical sections of a unit for such processes the formation of salt deposits can be removed or prevented by maintaining a water vapor pressure which lies above the equilibrium water vapor pressure of the salt deposits at the existing temperatures. The prescribed water vapor pressure is maintained by dividing the gas into at least two separate streams, cooling at least one of the streams solely by directly injecting water thereinto, cooling the remaining streams by indirect cooling, forming condensate in indirect coolers, and then joining the directly and indirectly cooled streams prior to introduction thereof into the critical sections. The condensate from the indirect coolers can be utilized for direct cooling. Salt deposits can be removed/prevented without the supply of extra energy, water vapor or liquid. The method can be adapted to existing plants without substantial alteration thereof.

2 Claims, 4 Drawing Figures

METHOD OF TRANSPORT, COOLING AND COMPRESSION OF NITROGEN OXIDE-CONTAINING GASES

BACKGROUND OF THE INVENTION

The present invention relates to a method for removal and/or prevention of formation of salt deposits in critical sections of a process plant, in which nitrogen oxide-containing gas is transported, cooled, and possibly dried by removal of condensate and compressed. In the gas of such a plant might be maintained a water vapour pressure which lies above the critical vapour pressure at the existing temperature for the salt deposits.

For catalytic combustion of ammonia to nitrogen oxides, it has been found that there will always be a certain penetration of uncombusted ammonia which proceeds in the process together with the nitrous gas. Especially during start up of the combustion furnaces the penetration of ammonia may be substantial. Ammonium salts will be formed during cooling of the gas, especially ammonium nitrate, which might crystallize and form deposits in the apparatus.

However, the formed salts are hygroscopic and easily soluble in water. When the relative humidity of the gases is higher than the critical humidity of ammonium nitrate, the ammonium nitrate will be present in the form of a solution and will not crystallize and form deposits.

The gases from the combustion unit are cooled before compression. When ammonia is combusted, water vapor is formed and removed from the gas as condensed water vapour during the latter part of the cooling step. The cooling is usually carried out by indirect cooling against cold surfaces such that the gas from the cooler has a dew point which is somewhat lower than the temperature of the gas. Accordingly, the gas will be reheated a few degrees because of the oxidation of NO to $NO_2$, between the outlet of the coolers and the compressor, according to equation:

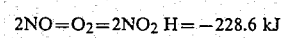

$$2NO = O_2 = 2NO_2 \ H = -228.6 \text{ kJ}$$

Because of this temperature rise and a certain admixture of secondary air, the relative humidity of the gas will decrease between the cooler and the compressor.

The problems which are caused due to the formation of salt deposits in the above mentioned plants have been known for a long time. The salt deposits can lead to reduced production capacity, increased energy consumption and safety risks. The rotors of the compressor have been found to be exposed to salt deposits which have led to unbalance and breakage of the rotor blades or other compressor damage.

It has been common practice to inject water into the nitrogen oxide-containing gas in order to remove salt deposits. The compressors are equipped with several nozzles for intermittent water injection during operation. The interval between each washing might be varied from 4-36 hours and the washing time can be varied between 10-30 minutes. Normal addition of water during the washing step is in the range 0.015-0.04 kg/Nm³ nitrogen oxide gas. Some nitrogen oxide gas compressors also have continuous water injection in the gas in addition to the discontinuous washing.

Usually water is also supplied continuously to the sealing system of the compressor in order to prevent salt deposits. This addition also ends up in the product either by evaporation into the nitrogen oxide gas or by drainage as condensate. Thus there are substantial amounts of water which are necessary to avoid salt deposits. Such addition of wash water into the nitrogen oxide gas or condensate is however strongly unwanted as the water must be compressed and because of the resulting corresponding reduction of the process water to the absorption system. This will also reduce the absorption effectiveness or the maximum obtainable product concentration.

Washing with water will often not give the required cleaning for retaining maximum capacity in spite of the lengthy injection of water into the compressor. The reason for this is that the injected water droplets will not moisten all the surfaces where salt deposits are present because of their inertia. In some compressors the accumulation on these surfaces will be so large that periodic water injection during reduction of the speed of the compressor are necessary in order to obtain maximum capacity.

Injected water droplets can also give substantial erosion in the compressor, especially on the rotor blades in axial compressors and around the pin holes in centrifugal compressors.

There further is known a method for removal of such salt deposits by supplying water vapour in such amounts that there is established a water vapour pressure which lies above the saturation pressure of the salt deposits at the existing temperatures to the nitrogen oxide-containing gas which has been dried during the cooling step. This method is described in U.S. Pat. No. 4,295,895. However, it has been found that even though the method according to this patent is efficient, for certain types of plants increased investments and operation expenses are required. Especially in older plants in which inexpensive steam is not available, this method might be less attractive from an economic point of view.

SUMMARY OF THE INVENTION

The object of the present invention is to provide a simplified, but at the same time effective method for preventing and/or removing salt deposits in plants containing nitrogen oxide-containing gases. A special object is to provide a method which can be used on existing plants without having to make any substantial investments in new equipment and/or any substantial operational changes.

Attempts to improve or simplify the above mentioned water washing methods, soon proved not to give the required efficiency.

From the knowledge of the physical conditions which have to be present in order to avoid formation of deposits, one started out by studying the possibility of providing a unit and a method which could be operated within such conditions without having to inject water vapour into the process gas.

Also the present method is based on the knowledge that ammonium nitrate can not exist in a stable solid form when it is in contact with gas having a water vapour partial pressure higher than the critical humidity of ammonium nitrate or when the temperature is above the sublimation point.

By a representative example for cooling, transference and compression of nitrogen oxide-containing gas in a conventional nitric acid plant, the relation between temperature and water vapour pressure can be as shown in FIG. 2. Curve 1 shows the stability range for ammonium nitrate and curve 2 shows the water vapour partial pressure. The figure shows that formation of deposits is possible in the apparatus at the conditions which exist after the gas cooler (about 30° C.) and until the temperature has increased to 160°-170° C. in the compressor.

By consciously providing that the nitrogen oxide-containing gas receives a sufficient water vapour partial presure, these basic physical data are used for carrying out the method for preventing the existence of salt deposits.

The gas which comes from the combustion unit has a sufficient water vapour content if it is not reduced below the critical humidity of the ammonium nitrate during the cooling step. The question was then how to maintain the necessary water vapour pressure in the nitrogen oxide-containing gas, after cooling and further when it is conveyed into the compressor. It was found that this could be obtained in a surprisingly simple way by utilizing the heat content and the moisture content of the gas in a new way. Without supply of extra vapour or other forms of energy, one obtained a water vapour pressure in the gas after the cooling section and in the compressor which was above the critical humidity of the salt deposit at the existing temperature. A normal course within the method according to the invention is shown by means of curve 3 in FIG. 2.

The cooling section can practically be changed in several ways which will give the same end effect regarding water vapour pressure in the gas. The simplest way is to reduce the cooling of the gas such that the water vapour pressure will not be too low. This implies, however, the disadvantage that the gas volume into the compressor will be too large and thereby substantial reduction of the capacity of the unit.

The special features of the invention are that the prescribed vapour pressure, which lies above the vapour pressure of the salt deposit at the existing temperature, is maintained just by cooling the gas in at least one cooler and/or by cooling the gas by direct injection of an amount of liquid which evaporates into the hot gas, and being sufficient to obtain the prescribed water vapour pressure.

The invention is preferably carried out by dividing the gas into several streams, cooling in two or several parallel coolers, and that the gas in at least one of them is cooled by injection of liquid directly into the gas. The rest of the gas is cooled by indirect cooling and the gas streams are mixed again before or in the unit where the salt deposits are to be removed or prevented.

BRIEF DESCRIPTION OF THE DRAWINGS

By direct cooling it is often most advantageous to use condensate from the indirectly cooled coolers.

The invention will be further explained in the following examples and description with reference to the accompanying drawings, wherein.

DETAILED DESCRIPTION OF THE INVENTION

Figure 1:
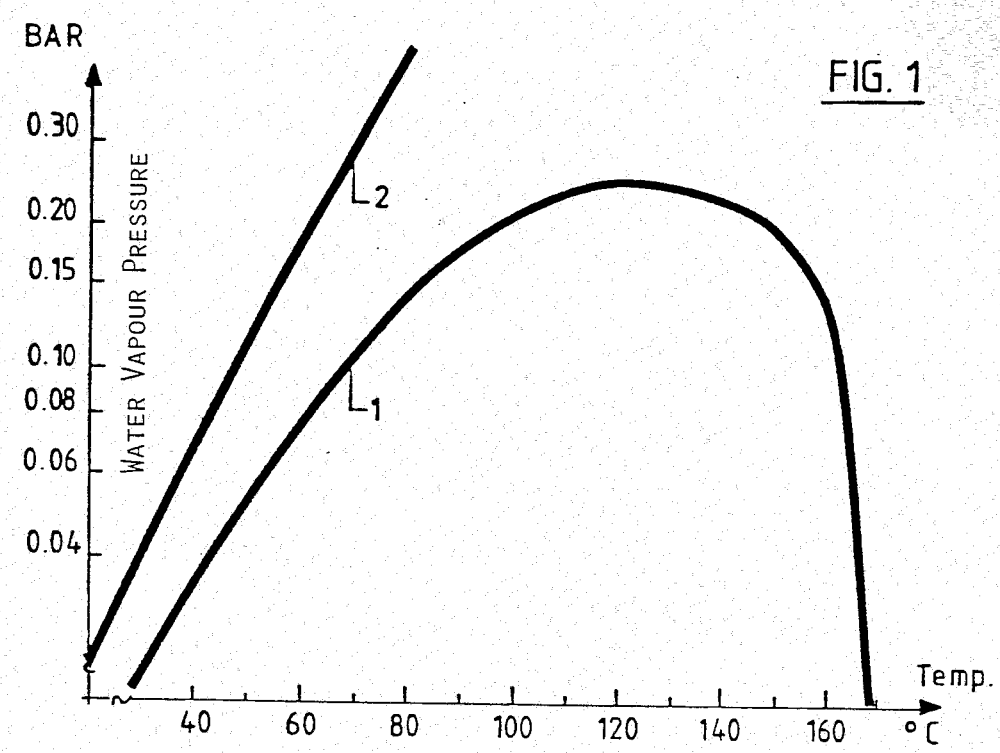
FIG. 1 is a graph showing the stability range for crystalline ammonium nitrate (curve 1) and water vapour pressure above pure water as a function of the temperature (curve 2)
Figure 2:
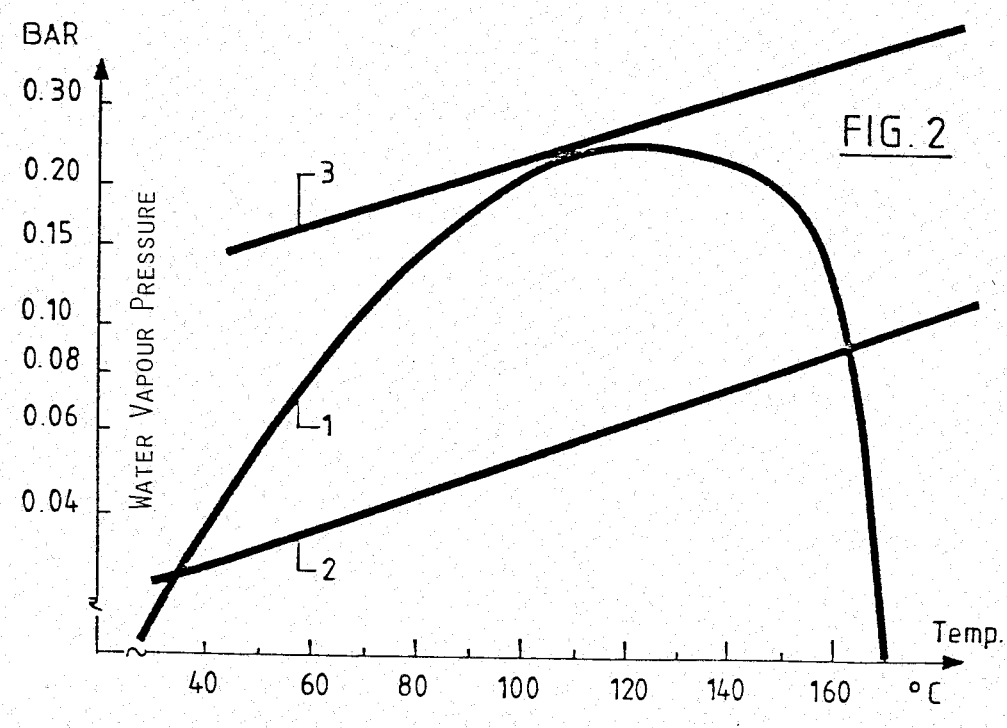
FIG. 2 is a schematic view of the relation between water vapour pressure and temperature in a arbitrarily chosen compressor.
Figure 3:
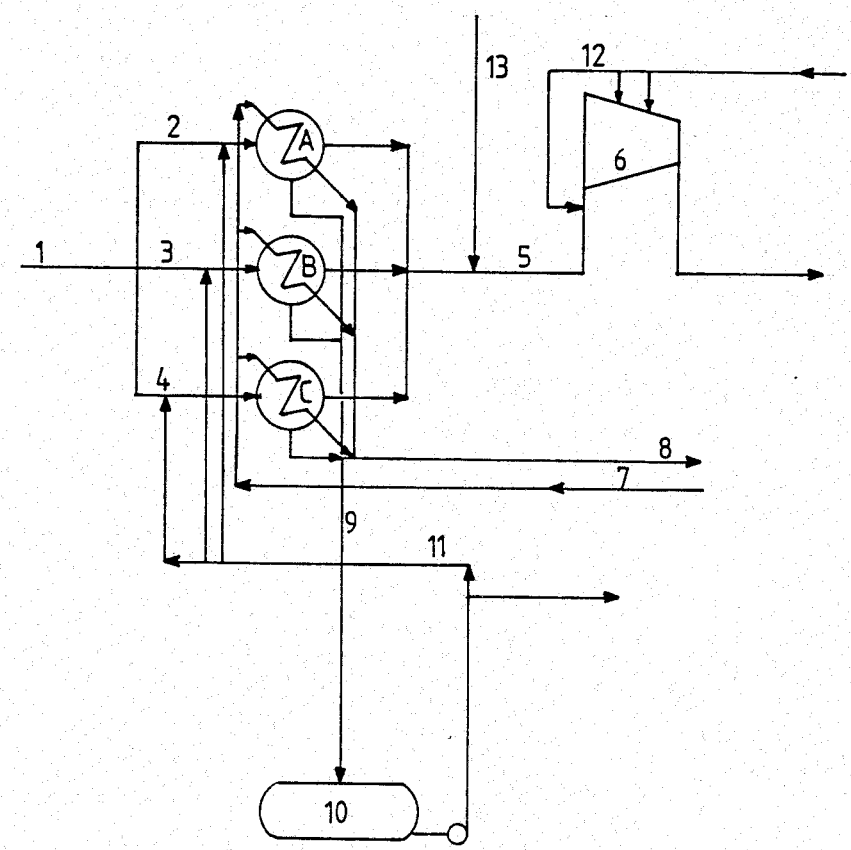
FIG. 3 shows a nitrogen oxide gas unit having a known cooling section.
Figure 4:
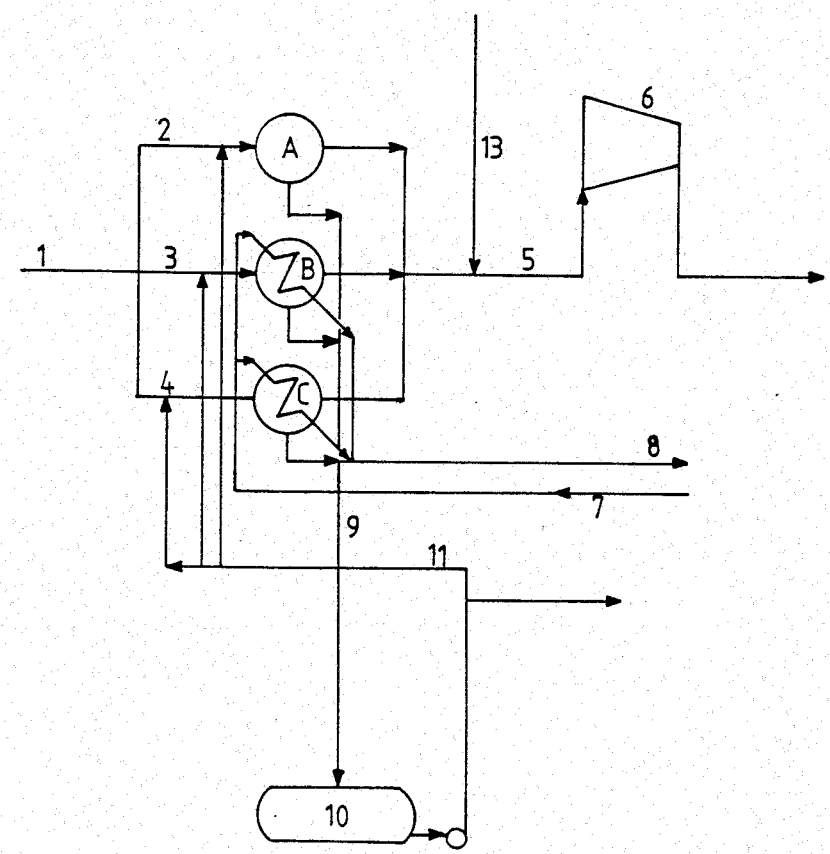
FIG. 4 shows a nitrogen oxide gas unit having a cooling section for application of the method according to the invention.

FIGS. 1 and 2 are described in above, and the following description will just be in connection with FIGS. 3 and 4 and the examples.

FIG. 3 shows a conventional unit in which nitrogen oxide-containing gas is conveyed in pipe (1) from an ammonia combustion unit (not shown) to a cooling section with three coolers (A, B, C) via separate pipes (2, 3, 4). Subsequent to the cooling, the gas streams are joined in one pipe (5) having supply of air for oxidation via pipe (13) and further to a compressor (6). To the compressor (6) and its inlet are means (12) for supply of water. To the coolers (A, B, C) is supplied water via pipe (7) for indirect cooling of the gas. The cooling water leaves the coolers through pipes (8). Condensate from the coolers is drained via pipes (9) and transferred to a tank (10) for condensate. Some condensate can be recirculated via pipe (11) to the separate gas pipes (2, 3, 4) ahead of the coolers (A, B, C).

FIG. 4 shows a process according to the invention when the function of the cooling section is changed relative to that shown in FIG. 3. By this operation of the invention, cooler (A) acts as a direct cooler as the gas here is only cooled with condensate via pipe (11). The gas in the coolers (B, C) is cooled in the same way as shown in FIG. 3. Condensate can be returned to the separate gas pipes (3, 4) in the same way as in FIG. 3.

EXAMPLE 1

This example is a comparative example and shows cooling of nitrogen oxide-containing gases in a unit corresponding to that shown in FIG. 3.

Gas having a temperature of about 160° C. from an ammonia combustion unit is cooled in three parallel gas coolers (A, B, C) to about 18° C.

The main part of that water vapour which is formed during the combustion of ammonia is condensed in the gas coolers. A condensate, 5-8% $HNO_3$-solution. is reinjected in the hot process gas in the gas coolers to improve absorption of unreacted ammonia from the combustion unit, and is again collected in condensates tank (10).

The condensate formed at any time is pumped out of the cooling system and supplied at a suitable place later on in the process.

The cooled gas is mixed with secondary air (13) before it is conveyed to an axial compressor in which the pressure is increased from about 0.95 bar to about 5 bar. The water vapour partial pressure in the inlet pipe (5) and through the compressor is shown by curve 2 in FIG. 2. Crystalline ammonium nitrate is stable up to about 170° C. In spite of the low ammonia penetration in the combustion unit and the efforts for improved absorption of ammonia in the gas coolers, there will be constant formation of ammonium nitrate in the supply pipe (5) to the axial compressor and in the compressor (6) itself.

One tried to remove the deposits by periodic water injection at the very inlet and to two later steps of the compressor (6), but water washing did not give the desired result. The compressor did not regain the same capacity as when it was clean. Especially at the very inlet to the compressor there occurred accumulation of substantial amounts of crystalline ammonium nitrate.

EXAMPLE 2

This example shows the operation according to the invention over an operation period in a unit as shown in FIG. 4. The method was used for periodic removal of ammonium nitrate deposits in the apparatus.

The indirect cooling water to the gas cooler (A) was closed, but the coolers (B, C) were run as during Example 1.

The gas through gas cooler (A), which at the inlet had a temperature of about 160° C., was now cooled only by means of injected condensate which partly evaporated. The amount of condensate was 0.1–0.2 kg/kg gas.

The gas from cooler (A) had a temperature of about 70° C. and a water vapour pressure corresponding to equilibrium with the injected 5–8% nitric acid. The gas streams through the two other coolers (B, C) were cooled as stated above to about 18° C.

By this method there were obtained two types of sub-streams, that is the sub-streams 3 and 4 which are cooled in the usual way by indirect cooling such that the water vapour pressure of the gas is lower than the equilibrium pressure and substream 2 which only is cooled by direct injection of liquid. The water vapour pressure of the gases will not be lower, but on the contrary, will increase because the sensible heat of the hot gases will be used for further increasing the water vapour pressure up to equilibrium.

The gas streams are again mixed after the coolers, and thus there is formed an oversaturated gas in which part of the water vapour condenses in form of fog which follows the gas.

The fog reevaporates during the further heating which takes place during the oxidation of NO to $NO_2$ and further on in compressor.

The water vapour content in the gas during this cleaning procedure is shown by curve 3 in FIG. 2.

The water vapour pressure is higher than the equilibrium vapour pressure of the ammonium nitrate and thus ammonium nitrate will be transferred to a liquid phase and be transported out of the compressor and the supply pipe.

The compressor regained full capacity and by inspection of the apparatus it was found that it was completely free of ammonium nitrate deposits.

The experience from this unit showed that cleaning takes place very rapidly and that the whole procedure including closure of cooling water supply, temperature rise to equilibrium and again supply of cooling water for ordinary operation could be carried out appropriately in about 30 minutes.

EXAMPLE 3

This example shows an operation according to the invention and in a unit as shown in FIG. 4, during start up of the combustion unit when the penetration of ammonia is especially large.

Diluted nitric acid was injected into the gas ahead of the gas coolers (A, B, C), and cooling water was supplied to coolers (B, C) while the cooler (A) was used for direct cooling by injection of diluted nitric acid which might be earlier produced condensate from the tank (10).

As soon as the combustion unit was started and heated gas arrived at the gas coolers, as in example 2, an oversaturated gas stream was formed by admixing the cold and the warmer saturated sub-streams.

The high moisture content of the gas streams (5) prevented formation of ammonium nitrate deposit even during the large ammonia penetration which takes place during start up.

When the condition in the combustion unit was stabilized and continuous cleaning was not necessary, there was established normal operation by connecting an indirect supply of cooling water to the third cooler also.

Removal of deposit was also carried out intermittently as described in example 2.

In this way deposit of ammonium nitrate in the supply pipe and the compressor was effectively prevented. Contrary to the method here described, it has in several production units been usual to wash the compressor continuously with water during start up until stable conditions in the compression unit are obtained. This water washing will, however, not give a complete cleaning.

As shown in the examples, removal of all of the ammonium nitrate deposits in the supply pipe and the nitrogen oxide gas compressor is obtained by the present invention without extra supply of water or vapour, by utilizing the water vapour content of the nitrogen oxide gas and the heat content from the combustion unit.

Contrary to the water washing method, corresponding to that shown in FIG. 1, complete removal of the ammonium nitrate deposit is obtained by the present invention, and thereby it is possible to provide compression of nitrogen oxide-containing gas without the large consumption of water as required by known methods. Means for injecting water to the compressor and the gas pipe will also be unnecessary.

Contrary to the method shown in the previously mentioned patent, the present invention makes it possible first of all to obtain a simpler unit and secondly reduce steam consumption. By the present invention an extra supply of energy is not needed. Also, during start up of the combustion unit, when the deposit problems are largest, the present invention will prevent and remove formation of deposits without an extra supply of steam during a period when the combustion unit itself is deficit of steam, and a steam driven turbine compressor needs a large supply of steam. Thus, the steam system does not have to be dimensioned for the supply of steam for removing deposits.

What is claimed is:

1. In a method for removing and preventing the formation of salt deposits in critical sections of a process plant in which hot nitrogen oxide-containing gas is transported, cooled, dried by removal of condensate and compressed, and wherein said gas at said critical sections is maintained at a desired water vapor pressure in excess of the equilibrium water vapor pressure of the salt deposits at the temperatures existing in the critical sections, the improvement wherein said desired water vapor pressure is maintained by:
    dividing said hot gas into at least two separate streams of hot gas;
    solely cooling at least one said stream by injecting directly thereinto water in liquid form in an amount which by evaporation into said hot gas is sufficient to achieve said desired water vapor pressure;
    cooling the remaining said streams by indirect cooling, forming condensate; and
    joining the thus directly and indirectly cooled said streams prior to introduction thereof into said critical sections.

2. The improvement claimed in claim 1, wherein said liquid water injected into said at least one stream comprises condensate formed during cooling of said remaining streams.

* * * * *